Feb. 19, 1957 W. W. FISHER ET AL 2,782,408

DIGITAL POTENTIOMETER FOR REFLECTED BINARY CODE

Filed Sept. 7, 1954 3 Sheets-Sheet 1

Walter W. Fisher
Carl E. Sohlgren
INVENTORS

BY

ATTORNEY

DIGITAL POTENTIOMETER FOR REFLECTED BINARY CODE

Filed Sept. 7, 1954

INVENTORS
Walter W. Fisher
Carl E. Sohlgren
BY [signature]
ATTORNEY

Feb. 19, 1957 W. W. FISHER ET AL 2,782,408

DIGITAL POTENTIOMETER FOR REFLECTED BINARY CODE

Filed Sept. 7, 1954 3 Sheets-Sheet 3

Walter W. Fisher
Carl E. Sohlgren
INVENTORS

BY [signature]
ATTORNEY

United States Patent Office 2,782,408
Patented Feb. 19, 1957

2,782,408

DIGITAL POTENTIOMETER FOR REFLECTED BINARY CODE

Walter W. Fisher, Pacoima, and Carl E. Sohlgren, San Fernando, Calif., assignors to Bendix Aviation Corporation, North Hollywood, Calif., a corporation of Delaware Application September 7, 1954, Serial No. 454,304

11 Claims. (Cl. 340—347)

This invention relates to electrical signaling systems employing binary code of the type variously known as the reflected code, the minimum error code, the Gray code, and the cyclic permutation code.

An object of the invention is to provide a simple and practicable system for converting reflected binary code signals into electrical impedance values.

Another object is to provide a simple and practicable system for setting a potentiometer in accordance with reflected binary code signals, whereby potentials proportional to the code values are produced.

Another object is to provide a continuous closed potentiometer circuit directly responsive to binary code signals that can be used in a synchro control system in place of a conventional synchro transmitter or control transformer.

A feature of the invention is a simple digital relay circuit responsive to reflected binary code signals for switching a small number of fixed impedance elements into a circuit in such combination as to produce in the circuit a total impedance corresponding to the value of the code.

Another feature of the invention is a closed potentiometer circuit having, as its only moving parts, relays responsive to multi-digit reflected binary code signals for simulating a conventional closed ring potentiometer having one or more continuously rotatable contacts.

Another object is to provide means for reduction of certain errors inherent in a ring potentiometer.

Another feature of the invention is a closed loop potentiometer circuit containing properly proportioned impedance elements for obtaining non-linear rotation of contacts which simulates the sinusoidal factor of voltage induction of variometer devices such as synchros.

Other more specific objects and features will appear from the description to follow.

Briefly, we have discovered that the characteristics of the reflected binary code are such that a series of impedance elements equal in number to the number of digits in the code and having impedances varying according to the geometric series *a*, 2*a*, 4*a*, 8*a*, etc., can be selectively introduced into a circuit by a very simple digital relay system in such fashion that the total impedance in the circuit corresponds to the number represented by the reflected binary code signals applied to the relays. Thus, if the code has four digits, a system containing four digital relays and four resistors of values R, 2R, 4R and 8R, respectively, will function in response to any of the 16 possible combinations of four binary digits to connect one or more of said resistors in a single circuit in such manner that the total resistance in the circuit corresponds to the number (between 0 and 15, inclusive) represented by the code combination. Furthermore, the system inherently defines a potentiometer circuit having two end terminals between which all of the resistors are connected in series in all positions of the relays, the relays functioning merely to switch the resistors from one side of an intermediate terminal to the other.

A full understanding of the invention may be had from the following detailed description with reference to the drawing, in which.

Figure 1:
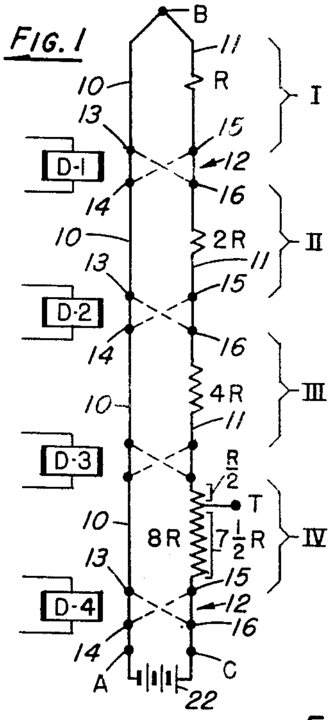
Fig. 1 is a schematic circuit diagram of a four-digit open-ended digital potentiometer in accordance with the invention.

Referring to Fig. 1, a simple four-digit potentiometer in accordance with the invention comprises four digital circuit sections I, II, III and IV which are identical except for their impedance values. Each section comprises a pair of conductors 10 and 11. One end 13 of conductor 10 constitutes a first input terminal, and the other end 14 constitutes a first output terminal. One end 15 of conductor 11 constitutes a second input terminal, and the other end 16 a second output terminal.

Each conductor 11 contains an impedance element, here shown as a resistor, the value of which doubles in successively higher digital sections. Thus, the element in the lowest digital Section I is identified as R, that in Section II as 2R, that in Section III as 4R, and that in Section IV as 8R.

Digital switches 12 connect the first and second input terminals 13 and 15 of each of Section I, II and III to the first and second output terminals of the next higher section, and the input terminals of Section IV to first and third main terminals A and C, respectively. The output terminals 14 and 16 of Section I are both connected to a second main terminal B. When any digital switch 12 is in a first position in response to a digital signal of one binary value (as "0") it completes a connection as shown in solid lines, and when it is in a second position in response to a digital signal of the other binary value (as "1") it completes a connection as shown in the dotted lines. It will be observed that a change in any digital signal causes the related switch 12 to simply transpose the connections to the associated circuit section.

Figure 1A:
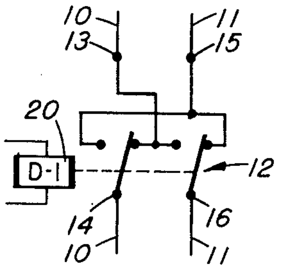
Fig. 1A is a schematic circuit diagram of a digital reversing switch or relay that may be used in the system of Fig. 1.

A simple relay circuit that may be employed for each of the switches 12 is shown in Fig. 1A as comprising a digital relay 20 having two movable contacts connected to the associated output terminals 14 and 16, respectively. Each movable contact has a back contact and a front contact, the back contact of one movable contact being connected to the input terminal 13 and the front contact connected to the input terminal 15 of the next lower section. On the other hand, the back contact of the other movable contact is connected to the input terminal 15, and the front contact is connected to the input terminal 13 of the next lower section.

It will be observed (Fig. 1) that when all the digital switches 12 are in their first ("0") positions, all of the impedance elements are connected between the second main terminal B and the third main terminal C, and the first main terminal A is connected directly to the second main terminal B. However, actuation of any switch 12 transposes all of the impedance elements between the switch and main terminal B into the opposite line, thereby deleting impedance from the circuit between the line terminals C and B, and inserting it between the line terminals A and B.

Figure 3:
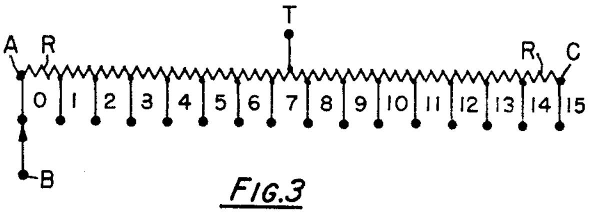
Fig. 3 is a schematic circuit diagram of a conventional potentiometer circuit corresponding in function to the circuit of Fig. 1.

The equivalent standard potentiometer circuit is shown in conventional form in Fig. 3 as a single resistor tapped at 14 points and having a resistance R between successive taps. By moving the contact connected to the terminal B to different taps, the resistance between terminals A and B can be increased, and that between terminals B and C simultaneously decreased by increments R. If a potential source is connected across terminals A and C (as indicated at 22 in Fig. 1), the voltage between A and B can be increased in 15 equal increments.

In a four-digit binary code system, 16 different signals could be transmitted and decoded by a suitable mechanism to move the tap of the potentiometer in Fig. 3 into a desired one of the 16 different positions, to translate the binary code signal into a corresponding resistance or voltage value. Such a mechanism would be quite complicated.

The system of Fig. 1 accomplishes the same result in a very simple manner and has the further advantage of responding to the reflected binary code, which has well-known advantages.

Table I (below) shows: A column of 16 decimal numbers (0 to 15 inclusive); the corresponding four-digit binary numbers according to the reflected binary code; the location of the resistors in the circuit of Fig. 1 for each binary number, and the total series resistance between each pair of terminals of Fig. 1.

TABLE I

| Pos. | Four Digit Reflected Code | | | | Location of Each Resistor | | Total Resistance | | |
|---|---|---|---|---|---|---|---|---|---|
| | 4 | 3 | 2 | 1 | A Side | C Side | A–B | C–B | A–C |
| 0 | 0 | 0 | 0 | 0 | 0 | 8R+4R+2R+R | 0 | 15 | 15 |
| 1 | 0 | 0 | 0 | 1 | R | 8R+4R+2R | 1 | 14 | 15 |
| 2 | 0 | 0 | 1 | 1 | 2R | 8R+4R+R | 2 | 13 | 15 |
| 3 | 0 | 0 | 1 | 0 | 2R+R | 8R+4R | 3 | 12 | 15 |
| 4 | 0 | 1 | 1 | 0 | 4R | 8R+2R+R | 4 | 11 | 15 |
| 5 | 0 | 1 | 1 | 1 | 4R+R | 8R+2R | 5 | 10 | 15 |
| 6 | 0 | 1 | 0 | 1 | 4R+2R | 8R+R | 6 | 9 | 15 |
| 7 | 0 | 1 | 0 | 0 | 4R+2R+R | 8R | 7 | 8 | 15 |
| 8 | 1 | 1 | 0 | 0 | 8R | 4R+2R+R | 8 | 7 | 15 |
| 9 | 1 | 1 | 0 | 1 | 8R+R | 4R+2R | 9 | 6 | 15 |
| 10 | 1 | 1 | 1 | 1 | 8R+2R | 4R+R | 10 | 5 | 15 |
| 11 | 1 | 1 | 1 | 0 | 8R+2R+R | 4R | 11 | 4 | 15 |
| 12 | 1 | 0 | 1 | 0 | 8R+4R | 2R+R | 12 | 3 | 15 |
| 13 | 1 | 0 | 1 | 1 | 8R+4R+R | 2R | 13 | 2 | 15 |
| 14 | 1 | 0 | 0 | 1 | 8R+4R+2R | R | 14 | 1 | 15 |
| 15 | 1 | 0 | 0 | 0 | 8R+4R+2R+R | 0 | 15 | 0 | 15 |

In Fig. 1, the digital relays are all in normal position corresponding to position 0, for which the reflected code is 0000, and all four resistors are connected between terminals B and C (identified as the "C Side" in the table).

In position I it will be observed from the table that one increment (R) of resistance must be transferred from the C side to the A side, and that the reflected code for position 1 is 0001, so that digital relay $D_1$ is energized to reverse (transpose) Section I with respect to Section II and accomplish the desired result.

In position 2, the reflected code is 0011, and the desired resistance in the A side is 2R. Hence, R must be restored to the C side, and 2R inserted in the A side. The single energization of digital relay $D_2$, without releasing relay $D_1$, automatically accomplishes this, since it transposes Section II with respect to Section III, while at the same time restoring Section I to its original relation with respect to Section III.

In position 3, the reflected code is 0010, and the desired resistance in the A side is $2R+R$. The deenergization of relay $D_1$ restores R into the A side and accomplishes the desired result.

From the foregoing examples, the circuit changes in response to any reflected code can be readily traced with the aid of the table.

It is sometimes desirable in a potentiometer circuit to have a fixed center tap T, as indicated in Fig. 3. Such a tap can be connected at the 7½R point on the resistor 8R, as shown in Fig. 1. Regardless of the positions of the switches, the resistance between this tap T and each of the terminals A and C will always be 7½R, or one-half the total resistance of 15R.

There is no limit to the number of digits that can be employed, a new relay and circuit section being added for each additional digit, and the resistor in each new section being double the value of the largest resistor previously in the system. A great advantage is that, although an additional relay must be added for each additional digit, the number of contacts on each relay does not increase.

Analyzing Fig. 1, it will be observed that the circuit has the following characteristics:

1. Each Section I, II, III or IV of the circuit has a pair of terminals at the bottom end, referred to as input terminals, and a pair of terminals at the top end, referred to as output terminals.

2. The impedance element in each section has double the impedance of the element in the next lower numbered section.

3. The actuation of the switch at the input end of any section transposes all of the lower numbered sections with respect to the terminals A and C.

It is by virtue of the above characteristics that the circuit automatically responds to the reflected binary code to produce between the terminals A and B an impedance corresponding to the number or position represented by the code.

Figure 2:
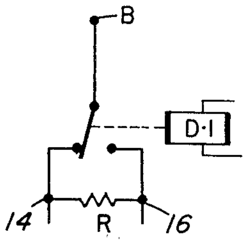
Fig. 2 is a schematic diagram of an alternative circuit for the lowest section of Fig. 1.

Since the output ends of conductors 10 and 11 in the lowest digital section I are connected together and to main terminal B, an alternative circuit (as shown in Fig. 2) employing a resistor R connected between terminals 14 and 16 of Section II, and a digital relay having only one set of transfer contacts can be employed if desired. It will be observed from Fig. 2 that one of the terminals 14 and 16 is connected directly to the second main terminal B, but that the other terminal is connected to terminal B through the resistor R.

We have discovered that it is possible in accordance with the invention to employ a digital potentiometer in place of the usual transmitter in a remote shaft positioning system of the synchro or selsyn type. In a typical synchro system, two synchros have their stators connected to each other by three transmission lines, and their rotor windings energized with A. C. power of the same frequency and phase, usually by connecting them both to a common A. C. source. In such a system, rotation (by an external force) of the rotor of one synchro (the synchro transmitter) into any angular position changes the stator currents in both synchros to develop a torque urging the rotor of the other synchros (the synchro receiver) into a corresponding angular position.

It is sometimes desirable to operate such a system in response to digital binary code signals representing different angular positions.

Figures 5, 7, 8:
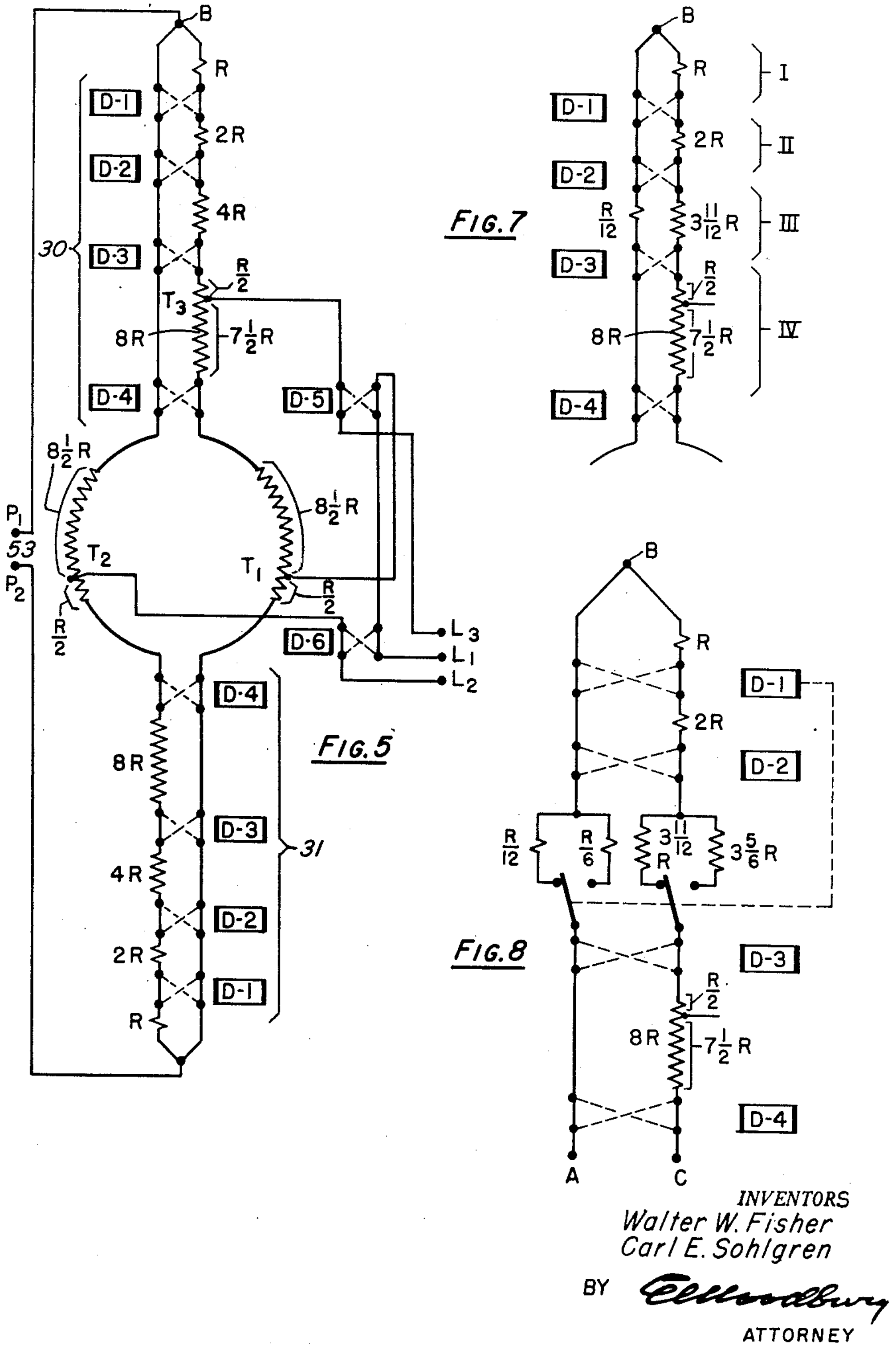
Fig. 5 is a schematic diagram of a digital closed potentiometer circuit that can be substituted for the rotary potentiometer of Fig. 4.
Fig. 7 is a schematic circuit diagram showing an alternative digital potentiometer circuit for use in the system of Fig. 5.
Fig. 8 is a schematic circuit diagram of still another alternative digital potentiometer that can be used in the system of Fig. 5.

In accordance with the present invention, a circuit employing two digital potentiometers, as shown in Fig. 5, can be substituted for the conventional transmitting synchro.

Figure 4:
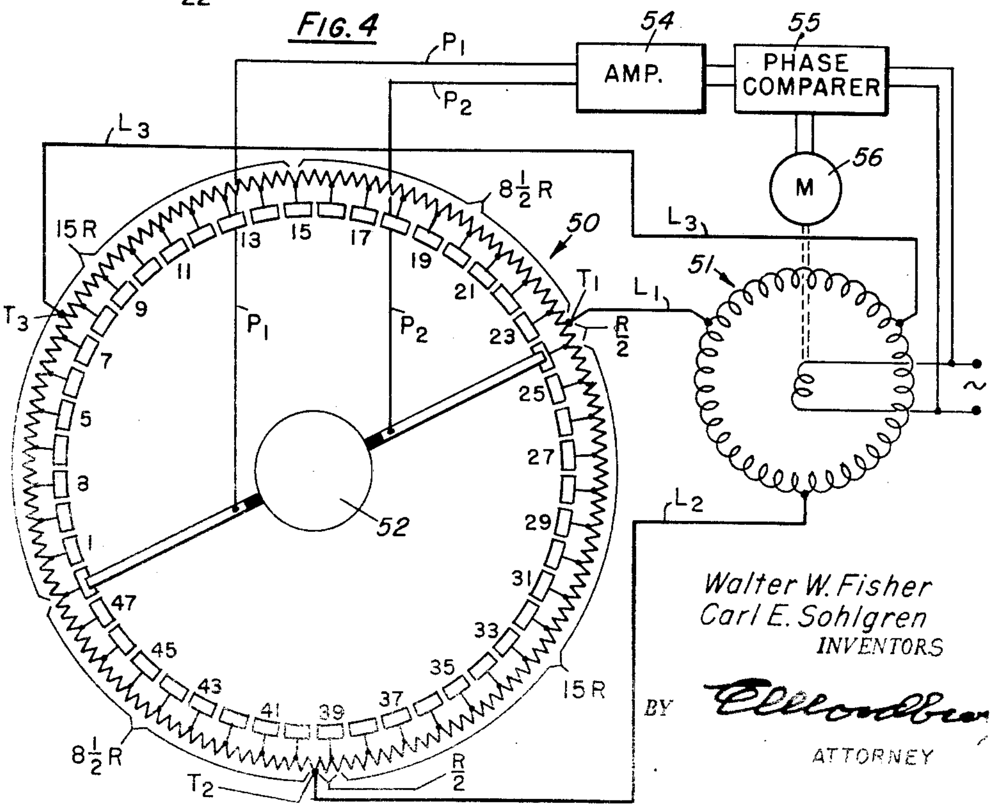
Fig. 4 is a schematic circuit of a servo control system employing a rotary potentiometer, in place of the conventional synchro control transformer.

Referring to Fig. 4 there is shown a schematic diagram of a servo system that is conventional except for the substitution of a closed potentiometer 50 for the conventional synchro control transformer (which would normally be identical with the synchro transmitter 51 at the controlled station). For each position of the rotor of the synchro transmitter (servo feed-back) 51, there is an angular position of the potentiometer 50 in which the potential between the contacts is zero (null). If the contacts of potentiometer 50 are rotated (as by the knob 52) out of null position, a potential is developed across the contacts which is transmitted over leads $P_1$ and $P_2$ to the controlled station, amplified in the amplifier 54 and compared with the potential across the rotor of the synchro transmitter 51 by comparer 55 to apply a current to the motor 56 which causes it to rotate the rotor of synchro transmitter 51 into position corresponding to the new position of the potentiometer 50, thereby restoring the null across the contacts of potentiometer 50.

The system of Fig. 4 has the limitation that the contacts of potentiometer 50 must be physically rotated. However, in accordance with the present invention, the potentiometer 50 can be replaced by a potentiometer having no rotating parts and employing as its only moving elements digital relays directly responsive to reflected binary code signals representing different angular positions. Such a digital potentiometer responsive to six-digit reflected binary signals is shown in the schematic diagram of Fig. 5, and will be explained with reference to table II.

TABLE II

| 1 Dec. No. | 2 Binary Code | 3 Relays Operated | | | | | | 4 Angular Positions, degrees | 5 |
|---|---|---|---|---|---|---|---|---|---|
| 0 | 000000 | ------ | ------ | ------ | ------ | ------ | ------ | 0 | ------ |
| 1 | 000001 | ------ | ------ | ------ | ------ | ------ | $D_1$ | 7½ | ------ |
| 2 | 000011 | ------ | ------ | ------ | ------ | $D_2$ | $D_1$ | 15 | ------ |
| 3 | 000010 | ------ | ------ | ------ | ------ | $D_2$ | ------ | 22½ | ------ |
| 4 | 000110 | ------ | ------ | ------ | $D_3$ | $D_2$ | ------ | 30 | ------ |
| 5 | 000111 | ------ | ------ | ------ | $D_3$ | $D_2$ | $D_1$ | 37½ | ------ |
| 6 | 000101 | ------ | ------ | ------ | $D_3$ | ------ | $D_1$ | 45 | ------ |
| 7 | 000100 | ------ | ------ | ------ | $D_3$ | ------ | ------ | 52½ | ------ |
| 8 | 001100 | ------ | ------ | $D_4$ | $D_3$ | ------ | ------ | 60 | 3¾ |
| 9 | 001101 | ------ | ------ | $D_4$ | $D_3$ | ------ | $D_1$ | 67½ | 11¼ |
| 10 | 001111 | ------ | ------ | $D_4$ | $D_3$ | $D_2$ | $D_1$ | 75 | 18¾ |
| 11 | 001110 | ------ | ------ | $D_4$ | $D_3$ | $D_2$ | ------ | 82½ | 26¼ |
| 12 | 001010 | ------ | ------ | $D_4$ | ------ | $D_2$ | ------ | 90 | 33¾ |
| 13 | 001011 | ------ | ------ | $D_4$ | ------ | $D_2$ | $D_1$ | 97½ | 41¼ |
| 14 | 001001 | ------ | ------ | $D_4$ | ------ | ------ | $D_1$ | 105 | 48¾ |
| 15 | 001000 | ------ | ------ | $D_4$ | ------ | ------ | ------ | 112½ | 56¼ |
| 16 | 011000 | ------ | $D_5$ | $D_4$ | ------ | ------ | ------ | 120 | 63¾ |
| 17 | 011001 | ------ | $D_5$ | $D_4$ | ------ | ------ | $D_1$ | 127½ | 71¼ |
| 18 | 011011 | ------ | $D_5$ | $D_4$ | ------ | $D_2$ | $D_1$ | 135 | 78¾ |
| 19 | 011010 | ------ | $D_5$ | $D_4$ | ------ | $D_2$ | ------ | 142½ | 86¼ |
| 20 | 011110 | ------ | $D_5$ | $D_4$ | $D_3$ | $D_2$ | ------ | 150 | 93¾ |
| 21 | 011111 | ------ | $D_5$ | $D_4$ | $D_3$ | $D_2$ | $D_1$ | 157½ | 101¼ |
| 22 | 011101 | ------ | $D_5$ | $D_4$ | $D_3$ | ------ | $D_1$ | 165 | 108¾ |
| 23 | 011100 | ------ | $D_5$ | $D_4$ | $D_3$ | ------ | ------ | 172½ | 116¼ |
| 24 | 010100 | ------ | $D_5$ | ------ | $D_3$ | ------ | ------ | 180 | 123¾ |
| 25 | 010101 | ------ | $D_5$ | ------ | $D_3$ | ------ | $D_1$ | 187½ | 131¼ |
| 26 | 010111 | ------ | $D_5$ | ------ | $D_3$ | $D_2$ | $D_1$ | 195 | 138¾ |
| 27 | 010110 | ------ | $D_5$ | ------ | $D_3$ | $D_2$ | ------ | 202½ | 146¼ |
| 28 | 010010 | ------ | $D_5$ | ------ | ------ | $D_2$ | ------ | 210 | 153¾ |
| 29 | 010011 | ------ | $D_5$ | ------ | ------ | $D_2$ | $D_1$ | 217½ | 161¼ |
| 30 | 010001 | ------ | $D_5$ | ------ | ------ | ------ | $D_1$ | 225 | 168¾ |
| 31 | 010000 | ------ | $D_5$ | ------ | ------ | ------ | ------ | 232½ | 176¼ |
| 32 | 110000 | $D_6$ | $D_5$ | ------ | ------ | ------ | ------ | 240 | 183¾ |
| 33 | 110001 | $D_6$ | $D_5$ | ------ | ------ | ------ | $D_1$ | 247½ | 191¼ |
| 34 | 110011 | $D_6$ | $D_5$ | ------ | ------ | $D_2$ | $D_1$ | 255 | 198¾ |
| 35 | 110010 | $D_6$ | $D_5$ | ------ | ------ | $D_2$ | ------ | 262½ | 206¼ |
| 36 | 110110 | $D_6$ | $D_5$ | ------ | $D_3$ | $D_2$ | ------ | 270 | 213¾ |
| 37 | 110111 | $D_6$ | $D_5$ | ------ | $D_3$ | $D_2$ | $D_1$ | 277½ | 221¼ |
| 38 | 110101 | $D_6$ | $D_5$ | ------ | $D_3$ | ------ | $D_1$ | 285 | 228¾ |
| 39 | 110100 | $D_6$ | $D_5$ | ------ | $D_3$ | ------ | ------ | 292½ | 236¼ |
| 40 | 111100 | $D_6$ | $D_5$ | $D_4$ | $D_3$ | ------ | ------ | 300 | 243¾ |
| 41 | 111101 | $D_6$ | $D_5$ | $D_4$ | $D_3$ | ------ | $D_1$ | 307½ | 251¼ |
| 42 | 111111 | $D_6$ | $D_5$ | $D_4$ | $D_3$ | $D_2$ | $D_1$ | 315 | 258¾ |
| 43 | 111110 | $D_6$ | $D_5$ | $D_4$ | $D_3$ | $D_2$ | ------ | 322½ | 266¼ |
| 44 | 111010 | $D_6$ | $D_5$ | $D_4$ | ------ | $D_2$ | ------ | 330 | 273¾ |
| 45 | 111011 | $D_6$ | $D_5$ | $D_4$ | ------ | $D_2$ | $D_1$ | 337½ | 281¼ |
| 46 | 111001 | $D_6$ | $D_5$ | $D_4$ | ------ | ------ | $D_1$ | 345 | 288¾ |
| 47 | 111000 | $D_6$ | $D_5$ | $D_4$ | ------ | ------ | ------ | 352½ | 296¼ |
| 48 | 101000 | $D_6$ | ------ | $D_4$ | ------ | ------ | ------ | 0 | 303¾ |
| 49 | 101001 | $D_6$ | ------ | $D_4$ | ------ | ------ | $D_1$ | 7½ | 311¼ |
| 50 | 101011 | $D_6$ | ------ | $D_4$ | ------ | $D_2$ | $D_1$ | 15 | 318¾ |
| 51 | 101010 | $D_6$ | ------ | $D_4$ | ------ | $D_2$ | ------ | 22½ | 326¼ |
| 52 | 101110 | $D_6$ | ------ | $D_4$ | $D_3$ | $D_2$ | ------ | 30 | 333¾ |
| 53 | 101111 | $D_6$ | ------ | $D_4$ | $D_3$ | $D_2$ | $D_1$ | 37½ | 341¼ |
| 54 | 101101 | $D_6$ | ------ | $D_4$ | $D_3$ | ------ | $D_1$ | 45 | 348¾ |
| 55 | 101100 | $D_6$ | ------ | $D_4$ | $D_3$ | ------ | ------ | 52½ | 356¼ |
| 56 | 100100 | $D_6$ | ------ | ------ | $D_3$ | ------ | ------ | 60 | ------ |
| 57 | 100101 | $D_6$ | ------ | ------ | $D_3$ | ------ | $D_1$ | 67½ | ------ |
| 58 | 100111 | $D_6$ | ------ | ------ | $D_3$ | $D_2$ | $D_1$ | 75 | ------ |
| 59 | 100110 | $D_6$ | ------ | ------ | $D_3$ | $D_2$ | ------ | 82½ | ------ |
| 60 | 100010 | $D_6$ | ------ | ------ | ------ | $D_2$ | ------ | 90 | ------ |
| 61 | 100011 | $D_6$ | ------ | ------ | ------ | $D_2$ | $D_1$ | 97½ | ------ |
| 62 | 100001 | $D_6$ | ------ | ------ | ------ | ------ | $D_1$ | 105 | ------ |
| 63 | 100000 | $D_6$ | ------ | ------ | ------ | ------ | ------ | 112½ | ------ |

In Fig. 5, when the digital code is 000000 (corresponding to an arbitrarily chosen position 0 in column 4 of Table II) the connections are as shown in the solid lines and the following conditions exist:

1. In the closed potentiometer circuit, there is a resistance of 16R between each adjacent pair of taps $T_1$, $T_2$ and $T_3$ so that they are symmetrically spaced as in Fig. 4.

2. There is a resistance of 24R moving clockwise from line $P_1$ to $P_2$ and also from line $P_2$ to $P_1$, so the impedance relations are the same as those between two diametrically opposite contacts on a circular potentiometer as shown in Fig. 4.

Operation of the digital relays $D_1$ (in response to the reflected binary code signal 000001) shifts the points of connection of lines $P_1$ and $P_2$ one increment clockwise 1/48 of a revolution, corresponding to an angular shift of the contacts in Fig. 4 of 7½°. Likewise, actuation of digital relays $D_1$ and $D_2$ produces a shift of 15°, of $D_2$ alone, 22½°, of $D_3$ and $D_2$ 30°, of $D_3$, $D_2$ and $D_1$ 37½°, of $D_3$ and $D_1$ 45°, and of $D_3$ alone 52½°. So far only the lower three digits $D_1$, $D_2$ and $D_3$ have been involved.

Actuation of $D_4$, in addition to $D_3$ (decimal number 8) increases the shift of $P_1$ and $P_2$ to 60°. It will be observed that this transposes the resistor 8R to the tap $T_3$ of which the line $L_3$ is connected, but the resistance between line $L_3$ and lines $L_1$ and $L_2$ is not altered, because line $L_3$ is tapped into the resistor 8R at the 7.5R point thereon which is the mid-tap of digital potentiometer 30 (see Fig. 3).

Actuation of relay $D_4$ alone, corresponding to the decimal number 15, shifts $P_1$ and $P_2$ 112½° from the starting point and exhausts the positions obtainable with four digits.

The next position, 16, corresponding to a shift of 120° is obtained by actuating relay $D_5$ which transposes the connections of lines $L_1$ and $L_3$, connecting line $L_1$ to tap $T_3$ and connecting line $L_3$ to tap $T_1$. The effect of this is to reduce the resistance between $P_1$ and $L_1$ from 8½R to 7½R and increase the resistance between $P_1$ and $L_3$ from 7½R to 8½R, which is equivalent to shifting the connection of $P_1$ one increment R (7½°) clockwise in Fig. 4. Likewise the resistance between $L_1$ and $P_2$ is increased from 15½R to 16½R and the resistance between $P_2$ and $L_3$ is reduced from 16½R to 15½R, equivalent to shifting the connection of $P_2$ one increment clockwise in Fig.

4. The resistance between $P_2$ and $L_2$ is unchanged, as in Fig. 4.

In the 16 positions, 16 to 31 inclusive, the 5th and 6th digits are unchanged, so that the connections from $L_1$ and $L_3$ remain transposed. It will be noted from Table II that the sequence of changes in the first, second, third and fourth digits in positions 16 to 31 inclusive is the mirror image of the changes from the first to the fifteenth positions. Hence, successive codes shift the connections of $P_1$ and $P_2$ by 7½° increments into position 31 corresponding to an angular displacement from the starting position of 232½°. It will be noted that in this position only relay $D_5$ is operated, the remainder being in normal position the same as in the starting position (0).

To shift from position 31 to position 32, the relay $D_6$ is operated for the first time. This does not affect the connection of line $L_3$ to tap $T_1$, but switches line $L_1$ from tap $T_3$ to tap $T_2$ and line $L_2$ from tap $T_2$ to tap $T_3$. The result is that the resistance between $P_1$ and line $L_1$ is increased from 7½R to 8½R and the resistance between line $P_1$ and line $L_2$ is decreased from 8½R to 7½R. At the same time the resistance between line $P_2$ and line $L_2$ is increased from 15½R to 16½R, and the resistance between line $P_2$ and line $L_1$ is reduced from 16½R to 15½R. Hence, the effect is the same as rotating the contacts in Fig. 5 one increment clockwise from position 31 to position 32.

From position 32 to position 47 inclusive, the digit relays $D_5$ and $D_6$ remain operated and the sequence of changes of the first four digits is exactly the same as in positions 0 to 15 inclusive so that the resistors in the digital potentiometers 30 and 31 are switched to successively reduce the resistance between lines $P_1$ and $L_3$ and the resistance between lines $P_2$ and $L_2$ by increments of R until the position 47 is reached.

Thereafter, restoration of digital relays $D_4$, $D_5$ and $D_6$ to "0" position by the code signal for position 0 connects the lines $L_1$, $L_2$ and $L_3$ to the potentiometer taps $T_1$, $T_2$ and $T_3$ respectively, and restores the digital potentiometers 30 and 31 to initial position as shown in Fig. 5.

If the code changes are made in reverse order, the switching is reversed to produce the same resistance changes (between lines $P_1$ and $P_2$ and the lines $L_1$, $L_2$ and $L_3$) in reverse order, which is equivalent to rotating the contacts in Fig. 4 in counterclockwise direction.

It can be seen from Table II that only three-fourths (48) of the binary numbers possible with six digits have been used to rotate the contacts one revolution. If the remaining fourth of the numbers were used, the contacts would continue to rotate clockwise another quarter revolution. Thus, the first sixteen binary numbers of the code and the last sixteen binary numbers of the code produce the same angular positions of the contacts. Therefore, one-fourth of the possible binary numbers should be left unused. It can be seen from Table II that if the last fourth (48 to 63) of the numbers were omitted, the last binary number would be 111000, and the next number, for the contacts to continue clockwise to the starting point, would be 000000. At this point, the minimum error advantage of the reflected code would be destroyed, since more than one digit changes at a time. The solution is to remove the unused numbers from other portions of the code, such as by omitting the first eight and the last eight numbers. The starting point is then at position 8 progressing through position 55. With this arrangement, the progession from the last number 101100 clockwise to to the first number 001100 requires only one digit to change, preserving the minimum error feature of the reflected code. It should be noted that the angular positions shown in column 4 of Table II are arbitrary and could be reassigned as desired.

It will be observed that when the portion of the code shown in column 5 of Table II is used, movement from 296¼° to 303¾° results from deenergization of digital relay $D_5$, which switches lines $L_1$, $L_2$ and $L_3$ from taps $T_2$, $T_3$, $T_1$ respectively to taps $T_2$, $T_1$, $T_3$ respectively. Thereafter, the positions 311¼° to 356¼° are obtained by the successive operation of relays $D_1$, $D_2$, $D_1$, $D_3$, $D_1$, $D_2$, $D_1$.

It can be seen from Fig. 5 that there is no position where a terminal $P_1$ or $P_2$ is directly connected to a line $L_1$, $L_2$ or $L_3$. The nearest that a terminal approaches this condition is to connect at points either side of a line with an interposing resistance $R/2$, which is equivalent to the contacts being positioned one-half an increment away from a position that would divide the loop resistance symmetrically with respect to the lines. Table II, column 4, shows the positions in degrees assigned relative to a first position, which is arbitrarily designated 0°. A synchro, on the other hand, is assumed to be positioned at 0° when the rotor is positioned in a symmetrical relationship with its stator windings. In Fig. 4, a null would be obtained with the synchro 51 in such a zero position if the rotary potentiometer 50 were constructed with a contact segment connected directly to an appropriate terminal $L_1$, $L_2$ or$L_3$.

Figure 6:
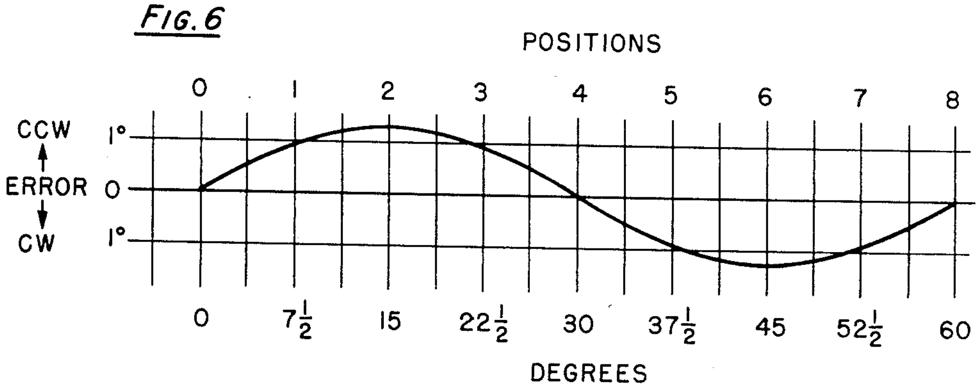
Fig. 6 is a graph showing inherent errors in the system of Fig. 4.

Starting with this zero position of the synchro 51 and designating it 0°, it would be found that as the synchro 51 and potentiometer 50 are rotated together, so as to continually retain a null across terminals $P_1$ and $P_2$, the angular positions of the two would be in agreement at 0°, 30°, 60°, and at each successive 30° point. For other positions, it would be found that the angular position of one would successively lead and lag the angular position of the other between successive 30° points approximately as shown in Fig. 6. This is an inherent error between a potentiometer and a synchro.

Figure 9:
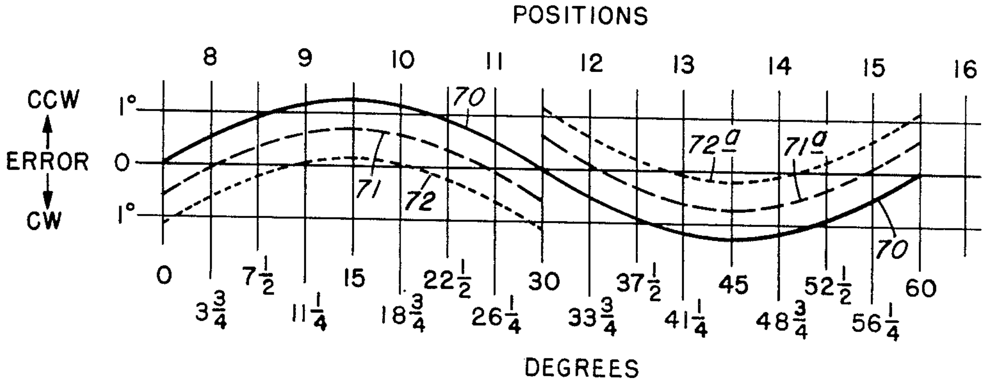
Fig. 9 is a graph showing the corrections of the inherent errors when the digital potentiometers of Figs. 7 and 8 are used in the circuit of Fig. 5.

If the potentiometer 50 were replaced with the digital potentiometer circuit of Fig. 5, then the same errors would prevail, but the discrepancies between the positions of the potentiometer and the synchro would be as shown by curve 70 in Fig. 9, illustrating that the starting position (8) is half an increment from the 0° point (point of symmetry of the potentiometer and synchro as previously explained) and in this particular illustration, with a six digit system, is half of 7½°, or 3¾° cw. Table II shows in the fifth column the angular positions of the potentiometer circuit of Fig. 5 from 8 to 55, inclusive, starting with the binary number 001100, corresponding to the angular starting position of 3¾°, as explained above.

The maximum errors (Fig. 9, curve 70) of slightly over 1° are not serious in many applications of the invention; however, circuits have been devised which will reduce the errors. The correction of errors can be made in successive modifications of the circuit of Fig. 5, each resulting in reducing the maximum error by at least one-half.

Referring to Fig. 9, the maximum error can be cut in half by tapering the resistor of potentiometer 50 (Fig. 4) to produce a shift of approximately ½° clockwise in one set of alternate 30° sectors and the same amount counterclockwise in the other set of alternate 30° sectors, as shown in the dashed curves 71 and 71*a* of Fig. 9. This is accomplished (in Fig. 5) by reducing the resistor 4R to 3$^{11}/_{12}$R and introducing $R/12$ into the other side of the section, as shown in Fig. 7.

This introduces a permanent shift of $^1/_{12}$ increment, or approximately ½°. The direction of shift (cw. or ccw.) depends upon the condition of each digit $D_3$, $D_4$, $D_5$ and $D_6$. In the first 30° sector, comprising positions 8, 9, 10 and 11, the shift is clockwise as shown by curve 71 in Fig. 9. This reduces the counterclockwise error at positions 8 and 11 to approximately zero, and of positions 9 and 10 to slightly more than ½°.

In position 12, the digital relay $D_3$ releases and transposes resistors $R/12$ and 3$^{11}/_{12}$R, thereby introducing a counterclockwise shift which reduces the clockwise errors in positions 12, 13, 14 and 15 to the same extent that the counterclockwise errors in positions 8, 9, 10 and 11 were reduced.

The positions of resistors $R/12$ and 3$^{11}/_{12}$R are transposed every 30° by changes in the conditions of digital relays $D_3$, $D_4$, $D_5$, $D_6$, so that corrections are made over the entire range.

In Fig. 5 modified as shown in Fig. 7, smaller increments of movement may be obtained without affecting the correction by adding digital relays and resistors to the outer ends of the potentiometers 30 and 31, each additional resistor being half the value of the next adjacent resistor as $R/2$, $R/4$, $R/8$, etc.

Additional correction can be employed to also reduce the errors of positions 9 and 10, 13 and 14, etc., to nearly zero, as shown in curves 72 and **72*a*** of Fig. 9. Reference to Table II shows that digit relay $D_1$ is energized whenever an additional correction is desired; i. e., at positions 9 and 10, 13 and 14, etc. Hence, digital relay $D_1$ can control the additional correction, and a circuit that can be used is shown in Fig. 8.

It will be observed that Fig. 8 differs from Fig. 7 only in that energization of digital relay $D_1$ by a "1" signal changes the impedance values in Section III from $3\frac{11}{12}$R and $R/12$, respectively, to $3\frac{5}{6}$R and $R/6$, respectively. The latter values are in the circuit when, and only when, the last digit of the code in Table II is "1," which is in positions 9 and 10, 13 and 14, 17 and 18, etc., which are the positions in which the full correction (curve 72 of Fig. 9) is desired. In all other positions, namely, positions 8, 11 and 12, 15 and 16, etc., the last digit is "0," and the desired partial correction (curve 71 of Fig. 9) is obtained.

It will be noted from Fig. 9 that the circuit of Fig. 8 provides a close approximation to complete correction at each position in a six-digit system, such as shown in Fig. 5. If more digits are added to provide smaller increments of adjustment, the error correction will be less complete at additional positions intermediate the positions 8, 9, 10, 11, 12, etc. (Fig. 9) than at those positions. This is obviously so, because either of the curves 71 and 72 can be made to cross the zero line at only two points.

As has been previously indicated, the circuit of Fig. 7 can be modified to handle a larger number of digits by adding additional sections to the outer end thereof having resistors of fractional values, such as $R/2$, $R/4$, $R/8$, etc. In other words, it is the impedance in the next to the highest section (section III in a four-digit system, as shown in Fig. 7) that must be divided between the two lines to effect the correction. The reason for this is that in the system of Fig. 5 it is the next highest section of the digital potentiometer that is reversed every 30°.

It will be seen that the closed potentiometer circuit of Fig. 5 can be substituted for a conventional synchro transmitter or control transformer in a synchro control system and enable actuation of the conventional synchro receiver or servomechanism in response to reflected binary code digital control signals without the use of rotary machinery and without first converting the reflected code digital control signals into natural code signals. This provides a less complicated and less expensive system. It also provides more rapid operation and eliminates hunting, because simple relays constitute the only moving elements and can be operated much more rapidly than a rotary machine can be started and stopped.

The substitution of a closed potentiometer for one of the two conventional synchros in a synchro system introduces an inherent error of approximately 0.4% maximum value, but this maximum error can be reduced to approximately 0.2% with the circuit of Fig. 7, and to approximately 0.1% with the circuit of Fig. 8. These errors are of minor importance in many practical applications of the invention.

*Summary*

There is shown in Fig. 1 a simple apparatus employing digital relays as the only moving elements for translating reflected binary code signals into impedance values between first and second main terminals A and B. At the same time, complementary impedances are developed between the second main terminal B and a third main terminal C, thereby simulating a conventional potentiometer as shown in Fig. 3. A fixed mid tap T between terminals A and C can be provided by tapping the impedance in the highest digital section at a point spaced $R/2$ from its output end where R is the impedance of the lowest section.

By connecting between the terminals A and C an additional impedance means of proper value and having three taps symmetrically spaced in the closed circuit, and properly switched between three lines, a closed potentiometer circuit having a rotating contact as shown in Fig. 4 can be simulated. Such a system is shown in Fig. 5 when only the digital apparatus 31 thereof is actuated. If the total impedance of apparatus 31 is Z, the additional impedance (which includes the two elements $R/2$, the two elements $8\frac{1}{2}$R, and the impedance of apparatus 30) must be $2Z+3R$.

The three lines $L_1$, $L_2$, $L_3$ are switched to different connections with the three taps $T_1$, $T_2$, $T_3$ by relays (D-5 and D-6 in Fig. 5) which are actuated by the two next higher digits from those actuating the digital apparatus 31.

By actuating the digital apparatus 30 with the same digital signals that are applied to apparatus 31, a second movable contact diametrically opposite the first may be simulated. Thus the terminals $P_1$ and $P_2$ in Fig. 5 have the same electrical relation to the lines $L_1$, $L_2$, $L_3$ as do the rotatable contacts of the potentiometer 50 in Fig. 4.

When a closed potentiometer such as 50 (Fig. 4) is used with a conventional magnetic machine such as the synchro 51, there is an inherent error between their positions as shown by the curve of Fig. 6. This same error exists between the system of Fig. 5 and a magnetic machine, but it can be reduced by dividing the impedance of that section of the digital apparatus corresponding to 30° between the two arms of the section as shown in Section III of Fig. 7, to obtain the curve 71 in Fig. 9. Since 30° is one-twelfth of 360°, the impedance of the section in which correction is made must be one-twelfth of the total impedance of the system.

The maximum error can be further reduced by shifting more of the impedance to the other side of the 30° section when the second digital relay therebelow is actuated, as shown in Fig. 8, to obtain (in certain positions) the curve 72 in Fig. 9. The maximum advantage of this second correction is realized when the digital apparatus has four digital sections.

When only one rotating contact of a potentiometer is to be simulated, only one of the two digital apparatuses 30 or 31 (Fig. 5) is needed, a simple impedance element of the same value being substituted for the apparatus not used. Either the digital apparatus 30 having the tap T, or the apparatus 31 having no tap can be replaced by simple impedance elements of the same impedance.

Although for the purpose of explaining the invention, a particular embodiment thereof has been shown and described, obvious modifications will occur to a person skilled in the art, and we do not desire to be limited to the exact details shown and described.

We claim:

1. Apparatus for translating reflected binary code multidigit signals into corresponding impedance values between first and second main terminals comprising: a plurality of digital circuit sections corresponding respectively to the different digits of said signal; each section above the lowest having first interconnected input and output terminals and second interconnected input and output terminals and every section containing impedance means of twice the impedance of the impedance means in the next lower section, the major portion of the impedance in each section being connected between its second input terminal and its second output terminal; a digital switch for each circuit section operable by its corresponding digit of the multidigit signal into first and second positions, respectively, according to the value of the digit; the highest digital switch connecting the first main terminal to the first or second input terminal of the highest digital section according to its position; each intermediate digital switch connecting the output terminals of the next higher section to the input terminals of its associated section in direct or transposed relation according to its position; and the lowest digital switch connecting said second main terminal directly to the first output terminal of the last intermediate section and through the impedance of the lowest section to the second output terminal of said last intermediate section in one position, and connecting said second main terminal directly to the second output terminal and through said last-mentioned impedance to said first output terminal of the last intermediate section in the other position.

2. Apparatus according to claim 1 in which the impedance of the lowest digital section is connected directly between the output terminals of the next higher section, and said lowest digital switch comprises transfer contacts for connecting the second main terminal directly to one or the other end of said impedance.

3. Apparatus according to claim 1, including a third main terminal and contacts on said highest digital switch for connecting said third terminal to said second or to said first input terminal of said highest digital section according to the position of the switch.

4. Apparatus according to claim 3, including a mid tap terminal connected to a tap on the impedance means in the highest digital section spaced $R/2$ from the second output terminal of said highest digital section, where R is the impedance of the impedance means in the lowest digital section.

5. A system for simulating the impedances between a contact movable by fixed increments over a closed potentiometer and three lines connected to three symmetrically spaced points on the potentiometer, said system comprising: digital apparatus according to claim 3 in which the impedance of the lowest digital section is R and the sum of the impedances of all the sections is Z; additional impedance means completing a closed circuit between said first main terminal and said third main terminal of said apparatus and having an impedance between said terminals of $2Z+3R$; first, second and third taps on said additional impedance means, the first tap spaced $2/R$ from said first main terminal, the second tap spaced $R/2$ from said third main terminal, and the third tap located midway on said additional impedance means; first, second and third lines; signal-responsive switching means for selectively connecting said first second and third lines to said first second and third taps respectively in response to a first signal, to said third second and first taps respectively in response to a second signal, to said second third and first taps respectively in response to a third signal, and to said second first and third taps respectively in response to a fourth signal; whereby successive applications of successive reflected binary code signals to said digital apparatus alternated with application of said first, second, third and fourth signals to said signal-responsive switching means switches said second main terminal by increments of R successively between said first, second and third lines.

6. Apparatus according to claim 5 in which said first, second, third and fourth signals are constituted by the four possible combinations of the two most significant digits of a reflected binary code, the remaining digits of which constitute the code actuating said digital apparatus.

7. A system for simulating the impedances between two contacts movable by fixed increments over a closed potentiometer and three lines connected to three symmetrically spaced points on the potentiometer, said system comprising: first and second digital apparatuses, each according to claim 3, in which the impedance of the lowest digital section is R and the sum of the impedances of all the sections is Z; a pair of impedance means, each having impedance of $$\frac{Z+3R}{2}$$

and connecting the first main terminal of one digital apparatus to the third main terminal of the other digital apparatus to complete a closed loop circuit in which said digital apparatuses are symmetrically oppositely disposed; a first tap on one impedance means and a second tap on the other impedance means, each tap spaced $$\frac{R}{2}$$

from said first digital apparatus; a third tap on the impedance means in the highest digital section of said second digital apparatus spaced $$\frac{R}{2}$$

from the second output terminal of said highest section; first, second and third lines; signal-responsive switching means for selectively connecting said first, second and third lines to said first, second and third taps, respectively, in response to a first signal; to said third, second and first taps, respectively, in response to a second signal; to said second, third and first taps, respectively, in response to a third signal; and to said second, first and third taps, respectively, in response to a fourth signal; whereby successive applications of successive reflected binary code signals to said digital apparatus alternated with application of said first, second, third and fourth signals to said signal-responsive switching means switches the second main terminals of said two digital apparatuses by increments of R successively between said three lines.

8. A system according to claim 5 in which the impedance of one section of said digital apparatus is 1/12 of the total impedance of the system and corresponds to an angle of 30° on a circular closed potentiometer, and in which a minor portion of the said impedance of said one section is connected between its first input and output terminals, and the remainder is connected between its second input and output terminals.

9. A system according to claim 8 including means responsive to the second less significant digit signal from the digit associated with said one section for redistributing the impedance of said one section to increase said minor portion thereof when, and only when, said second less significant digit has a predetermined one of its two possible values.

10. A system according to claim 9 in which said digital apparatus has four digital sections.

11. A system for simulating the impedances between a contact movable by fixed increments over a closed potentiometer and three lines connected to three symmetrically spaced points on the potentiometer, said system comprising: digital apparatus according to claim 4 in which the impedance of the lowest digital section is R and the sum of the impedances of all the sections is Z; impedance means completing a closed circuit between said first main terminal and said third main terminal of said apparatus and having an impedance between said terminals of $2Z+3R$; first and second taps on said impedance means each spaced $$\frac{Z}{2}+R$$

from said first and third main terminals, respectively, of said digital apparatus, and said third tap being connected to said mid tap of said digital apparatus; first, second and third lines; signal-responsive switching means for selectively connecting said first second and third lines to said first second and third taps respectively in response to a first signal, to said third second and first taps respectively in response to a second signal, to said second third and first taps respectively in response to a third signal, and to said second first and third taps respectively in response to a fourth signal; whereby successive applications of successive reflected binary code signals to said digital apparatus alternated with application of said first, second, third and fourth signals to said signal-responsive switching means switches said second main terminal by increments of R successively between said first, second and third lines.

References Cited in the file of this patent

UNITED STATES PATENTS

| | | |
|---|---|---|
| 2,023,221 | Fischer et al. | Dec. 3, 1935 |
| 2,466,763 | Davis | Apr. 12, 1949 |
| 2,630,552 | Johnson | Mar. 3, 1953 |
| 2,685,074 | Lippel et al. | July 27, 1954 |